US 11,360,202 B2

(12) United States Patent
Mayer et al.

(10) Patent No.: US 11,360,202 B2
(45) Date of Patent: Jun. 14, 2022

(54) FMCW RADAR SENSOR

(71) Applicant: Robert Bosch GmbH, Stuttgart (DE)

(72) Inventors: Marcel Mayer, Lonsee (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 16/766,670

(22) PCT Filed: Nov. 22, 2018

(86) PCT No.: PCT/EP2018/082297
§ 371 (c)(1),
(2) Date: May 22, 2020

(87) PCT Pub. No.: WO2019/141413
PCT Pub. Date: Jul. 25, 2019

(65) Prior Publication Data
US 2020/0363520 A1 Nov. 19, 2020

(30) Foreign Application Priority Data
Jan. 18, 2018 (DE) .................... 10 2018 200 765.9

(51) Int. Cl.
*G01S 13/34* (2006.01)
*G01S 7/35* (2006.01)
*H01Q 25/02* (2006.01)

(52) U.S. Cl.
CPC ............. *G01S 13/34* (2013.01); *G01S 7/352* (2013.01); *H01Q 25/02* (2013.01)

(58) Field of Classification Search
CPC .......... G01S 13/34; G01S 7/352; H01Q 25/02
(Continued)

(56) References Cited

U.S. PATENT DOCUMENTS 4,749,995 A * 6/1988 Hopwood ................ H01Q 3/22
342/371
5,351,053 A * 9/1994 Wicks .................. G01S 13/282
342/158
(Continued)

FOREIGN PATENT DOCUMENTS

EP 2294446 B1 * 10/2018 ........... G01S 13/343
WO 2008149351 A2 12/2008
(Continued)

OTHER PUBLICATIONS

Feger R et al. "A 77 GHz FMCW MIMO Radar Based on an SiGe Single Chip Transceiver", IEEE Transactions of Microwave Theory and Techniques, Plenum, USA, vol. 57, No. 5, (May 1, 2009), pp. 1020-1035, XP011255346, ISSN: 0018-9480 (Year: 2009).*
(Continued)

*Primary Examiner* — Bernarr E Gregory
*Assistant Examiner* — Nuzhat Pervin
(74) *Attorney, Agent, or Firm* — Norton Rose Fulbright US LLP; Gerard Messina

(57) ABSTRACT

An FMCW radar sensor having a plurality of antenna elements at a distance from one another in a row, to each of which is assigned a mixer, which produces an intermediate frequency signal, and an evaluation unit that is designed to record the intermediate frequency signal over a measurement period as a function of time and to convert the time signal into a spectrum, and having an angular measuring device in which the spectra obtained from the evaluation devices are evaluated in separate channels. The sensor further including a beamforming device to carry out a beamforming for the signal received from a specified preferred direction by compensating run length differences of the signal to the antenna elements, a summation device forming a sum spectrum through coherent addition of the spectra, and a distance measuring device determining dis-
(Continued)

tances of objects in the preferred direction on the basis of the sum spectrum.

7 Claims, 5 Drawing Sheets

(58) Field of Classification Search
USPC .......................................................... 342/385
See application file for complete search history.

(56) References Cited

U.S. PATENT DOCUMENTS

| | | | | |
|---|---|---|---|---|
| 6,031,483 | A * | 2/2000 | Urabe | G01S 13/345 342/128 |
| 6,624,783 | B1 * | 9/2003 | Rabideau | G01S 7/292 342/131 |
| 8,666,118 | B2 * | 3/2014 | Lindholm | G01S 7/6263 382/106 |
| 11,194,033 | B2 * | 12/2021 | Yamanouchi | G01S 13/34 |
| 2005/0156780 | A1 * | 7/2005 | Bonthron | G01S 3/48 342/134 |
| 2005/0225481 | A1 * | 10/2005 | Bonthron | H01Q 21/0093 342/175 |
| 2016/0131742 | A1 * | 5/2016 | Schoor | G01S 13/931 342/128 |
| 2018/0011180 | A1 * | 1/2018 | Warnick | G01S 13/32 |

FOREIGN PATENT DOCUMENTS

| | | | | |
|---|---|---|---|---|
| WO | WO-2008149351 | A2 * | 12/2008 | ............. H01Q 1/241 |
| WO | WO-2010000252 | A2 * | 1/2010 | ............ G01S 13/343 |
| WO | WO-2010000254 | A2 * | 1/2010 | ............ G01S 13/343 |
| WO | WO-2015197223 | A1 * | 12/2015 | ......... G01S 13/0209 |
| WO | WO-2015197226 | A1 * | 12/2015 | ......... G01S 13/0209 |
| WO | WO-2017084661 | A * | 5/2017 | ............ G01S 13/343 |

OTHER PUBLICATIONS

International Search Report for PCT/EP2018/082297, dated Feb. 20, 2019.
Feger R et al., "A 77-GHz FMCW MIMO Radar Based on an SiGe Single-Chip Transceiver", IEEE Transactions on Microwave Theory and Techniques, Plenum, USA, vol. 57, No. 5, 2009, pp. 1020-1035. XP011255346.

* cited by examiner

FMCW RADAR SENSOR

FIELD

The present invention relates to an FMCW radar sensor having a plurality of antenna elements configured at a distance from one another in a row, to each of which there is assigned a mixer, which produces an intermediate frequency signal by mixing a received signal with an oscillator signal, and an evaluation unit that is designed to record the intermediate frequency signal over a measurement period as a function of time and to convert the time signal thus obtained into a spectrum by Fourier transformation, and having an angular measuring device in which the spectra obtained from the various evaluation devices are further evaluated in separate channels.

BACKGROUND INFORMATION

In conventional FMCW radar sensors, the frequency of the transmit signal is modulated with a ramp shape. In the receive part, by mixing the received signal with the transmit signal an intermediate frequency signal is obtained whose frequency is a function of the frequency difference between the currently sent signal and the received signal. On the basis of the ramp-shaped modulation, this frequency difference is a function of the runtime of the radar waves from the sensor to the object and back to the sensor. Through Fourier transformation, a spectrum of the intermediate frequency signal is obtained in which each located object is shown as a peak at a frequency that is a function of the distance from the object. Due to the Doppler effect, the frequency position of the peak is however also a function of the relative speed of the object. In order to separate the distance-dependent and speed-dependent portions from one another, it is conventional to use a plurality of frequency ramps having different slopes one after the other. Because only the distance-dependent portion of the frequency is a function of the ramp slope, the distance and the relative speed of the object can be determined by comparing the frequency positions obtained at the various ramps.

The fact that the measurement periods over which the time signal is recorded can have only a limited length has the result that in the Fourier transformation, artefacts are produced in the form of side lobes that make the interpretation of the signal more difficult. It is conventional to largely suppress such side lobes by "windowing" the time signal before the Fourier transformation using a suitable window function, for example by multiplying the time signal by a window function that is also a function of time. The window function, for example a so-called Hamming window, primarily has the effect that the abrupt transitions in the time signal at the beginning and at the end of the measurement period are smoothed out, and in this way the side lobes are reduced.

Radar sensors of this type are already widely used as sensor components in driver assistance systems for motor vehicles. As driver assistance systems continue to develop towards highly autonomous driving, increasingly greater demands have been placed on the performance of the radar sensors. In order to achieve better angular resolution, for example in the azimuth, the number of antenna elements configured in a row can be increased. In the case of objects having a very small azimuth angle, the location sensitivity can then also be increased by coherently adding the signals received by the various antenna elements, which are then essentially phase-identical for the object, so that through constructive superposition a better signal/noise ratio is obtained.

An improved distance resolution can be achieved in that the ramp-shaped modulation of the transmit signal is carried out with a larger frequency shift. In this way, in the spectrum the frequency distance becomes larger between two peaks of objects that are located at different distances. The distance space can correspondingly be subdivided into a larger number of distance bins, while the requirement continues to be met that each object peak can be uniquely assigned to a particular distance bin.

However, for objects whose location direction deviates from the normal to the row of antenna elements by a larger angle, as the aperture of the antenna array becomes larger (with a correspondingly greater distance between antenna elements at the opposite ends of the array) there result significant run length differences between the signals that are received from the same object in different antenna elements, so that during the coherent addition destructive interference may occur due to the phase differences. Due to the run length differences, an increase in the frequency shift then results in a widening of the peaks, so that the sought improvement of the distance resolution is no longer achieved to its full extent.

SUMMARY

An object of the present invention is to improve the location sensitivity and/or the distance resolution for objects situated in a particular preferred direction.

According to the present invention, this object may be achieved in accordance with an example embodiment by:
- a beamforming device that is designed to carry out a beamforming for the signal received from a specified preferred direction by compensating run length differences of the signal to the different antenna elements,
- a summation device for forming a sum spectrum through coherent addition of the spectra, and
- a distance measuring device for determining distances of objects in the preferred direction based on the sum spectrum.

The present invention makes it possible, for a specified preferred direction, to compensate the run length differences in such a way that the beamforming for this direction is optimized, and correspondingly the coherent addition results in greater location sensitivity and improved distance resolution for objects situated in the selected preferred direction. In particular, through the compensation of the run length differences it is achieved that the increase of the frequency shift does not result in a widening of the peaks, but rather in an improvement of the distance resolution.

Advantageous embodiments and developments of the present invention are described herein.

The beamforming can take place in the following way. One possibility is to carry out the compensation of the run length differences in the individual evaluation devices by windowing the time signals there with suitably selected complex-valued window functions. Here, a property of the Fourier transformation is exploited, namely that via the choice of the complex-valued window function, it can be brought about that the spectrum obtained by the Fourier transformation shifts on the frequency axis by an amount that can be adjusted. When the transmit signal is received by different antenna elements, the runtime differences from the one antenna element to the other in the mixing of the receive signal with the oscillator signal (transmit signal) result in a frequency difference that falsely simulates a change in the object distance. However, because the frequency shift achieved by the window function of the peaks in the spectrum can also be interpreted as an (apparent) change of the object distance (here the influence of the Doppler effect, given a non-negligible relative speed, does not need to be taken into account), the runtime differences can be compensated by a suitable frequency shift using the window function without requiring expensive measures for adapting conductor lengths.

In this specific embodiment, the preferred direction can be varied depending on the situation by using, in the individual evaluation devices, window functions that bring about different frequency shifts.

Optionally, the compensation of the run length differences can however also be achieved by adapting conductor lengths, for example by selecting, for each antenna element, the conductor length from the antenna element to the mixer such that a signal delay results that compensates the run length difference. Likewise, the run length difference can also be compensated by selecting a different conductor length for each antenna element for the conductors on which the oscillator signal is supplied to the mixer.

In the above-described specific embodiments, the preferred direction is determined by the selected conductor lengths. However, it is possible to change over in a situation-dependent fashion between different conduction paths, whereby a changeover between the relevant preferred directions is then also achieved.

The present invention can be used both in bistatic antenna designs and in monostatic antenna designs. In monostatic antenna designs, each of the antenna elements can be used for transmission (MIMO: Multiple Input Multiple Output), or only one selected antenna element is used for transmission while the other antenna elements are used only for reception. In monostatic MIMO solutions, if the beamforming is achieved by adapting conductor lengths, a beamforming can also be brought about in the transmission path, depending on the specific embodiment.

In the following, an exemplary embodiment is explained in more detail based on the figures.

DETAILED DESCRIPTION OF EXAMPLE EMBODIMENTS

Figure 1:
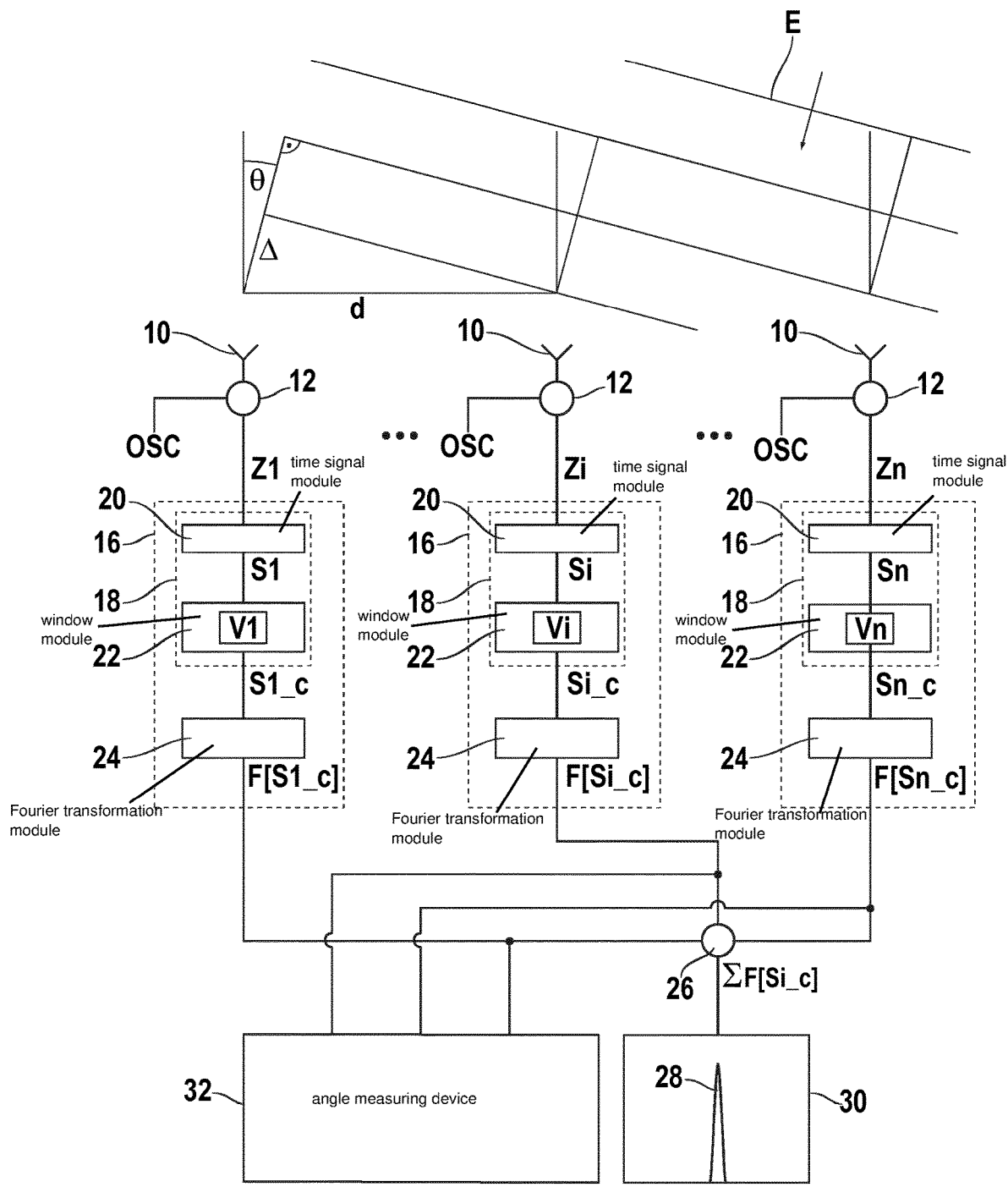
FIG. 1 shows a block diagram of certain main components of an example radar sensor according to the present invention.

The radar sensor shown in FIG. 1 has a plurality (n) of antenna elements 10 configured in a row (ULA: Uniform Linear Array), to each of which a mixer 12 is assigned. In general, the row of antenna elements can also be part of a two-dimensional antenna array. The mixers obtain phase-identical oscillator signals OSC from a common local oscillator. In this example, antenna elements 10 are used only to receive a radar signal E. For the sending of radar waves, at least one further antenna element (not shown) is provided, to which the same oscillator signal OSC is supplied as is supplied to mixers 12.

The radar echo reflected by an object (not shown) is received by antenna elements 10 and is respectively mixed with oscillator signal OSC in mixers 12, producing in each case an intermediate frequency signal Z1, Zi, Zn that is outputted to an evaluation unit 16.

Each evaluation unit 16 contains a pre-processing stage 18 having a time signal module 20 in which the intermediate frequency signal is digitized and is recorded, over a specified measurement period, as a function of time. In this way, a digital time signal S1, Si, Sn is formed that is provided to a window module 22 in which the time signal produced from the intermediate frequency signal is windowed with a window function V1, Vi, Vn. In this way, a corrected time signal S1_c, Si_c, Sn_c is formed that is then converted, in a Fourier transformation module 24 of evaluation unit 16, into a spectrum F[S1_c], F[Si_c], F[Sn_c] by Fourier transformation. In a summation device 26, the spectra are coherently added (i.e., addition of the complex amplitudes before the square of the magnitude is formed). The obtained sum spectrum (square of the magnitude as a function of the frequency) is also shown graphically in FIG. 1, and contains a single peak 28 whose frequency position indicates the distance of the located object. For simplicity, here it will be assumed that the relative speed of the object is zero, so that there is no Doppler shift. On the basis of the sum spectrum, in a distance measuring device 30 the distance of the located object is determined with high resolution.

Parallel to this, in an angle measuring device 32 the azimuth angle of the object is determined (with a horizontal configuration of the row of antenna elements 10). For this purpose, the spectra F[S1_c], . . . supplied by the individual evaluation devices 16 are evaluated in separate evaluation channels, so that the azimuth angle can be determined on the basis of the angle-dependent amplitude and phase relationships between the received signals. In principle, in angle measuring device 32 a value for the distance of the object can also be determined in each case on the basis of the individual spectra, but due to the worse signal/noise ratio the location sensitivity and the accuracy of the distance measurement are lower here.

In order to achieve higher location accuracy and a high degree of distance resolution in distance determining device 30, in the case of objects having an azimuth angle θ other than zero, the run length differences Δ between the radar waves received by the various antenna elements 10 must be compensated. As FIG. 1 shows schematically, these run length differences result due to the angled position of the wave fronts of signal E relative to the normals to the row of antenna elements 10, and are thus a function of the azimuth angle θ. In addition, they are proportional to the distance d between the individual antenna elements 10.

$$\Delta = d \sin(\theta).$$

A compensation of the run length differences is therefore possible only for a particular azimuth angle θ that indicates a particular direction of incidence of radar radiation E. This direction of incidence is here referred to as the "preferred direction," and is indicated by the angle θ.

In the example shown here, the compensation of the run length differences, the so-called beamforming, is done computationally by using special window functions Vi (i=1, . . . , n) in window modules 22, as is explained in more detail in the following.

Figure 2:
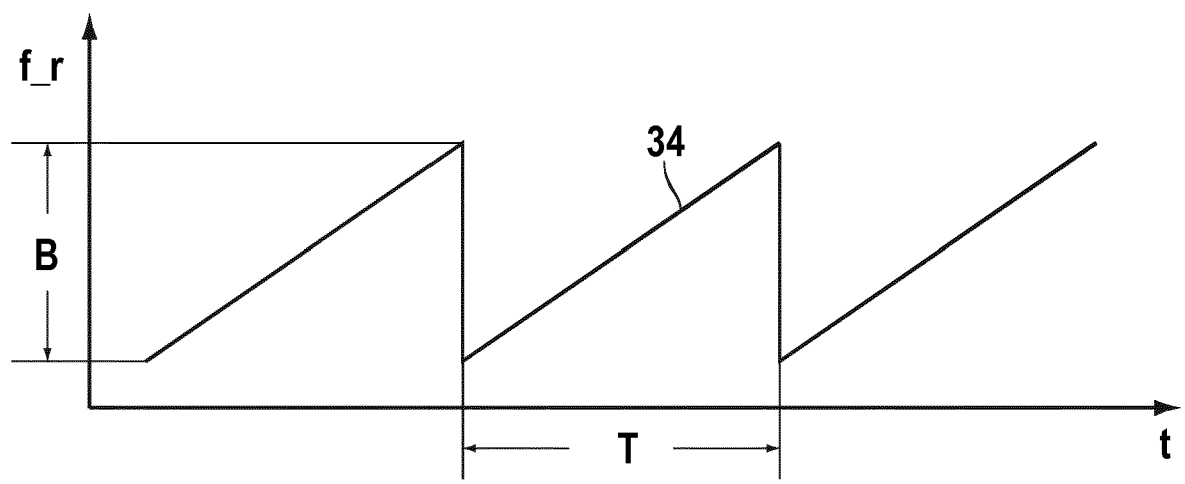
FIG. 2 shows a time diagram illustrating the frequency modulation in an example FMCW radar unit.

FIG. 2 shows a (simplified) example of a modulation schema with which the frequency of oscillator signal OSC, and thus also the frequency f_r of the sent radar waves, is modulated. Frequency f_r is shown as a function of time t, and has a sequence of modulation ramps 34 having a ramp slope B/T, where B is the frequency shift and T is the duration of the modulation ramp. This duration T is at the same time also the duration of the measurement period over which the time signal is recorded in time signal module 20.

In each mixer 12, the received signal E is mixed with oscillator signal OSC, whose frequency corresponds to the frequency of the currently sent radar signal. The frequency of received signal E is, in contrast, given by the frequency of oscillator signal OSC at the time at which the signal was sent out. The frequency difference, and thus the frequency (beat frequency) of the relevant intermediate frequency signal Z1, Zi, Zn, is thus proportional to the total runtime of the signal from the radar sensor to the object and back to the relevant antenna element 10, and proportional to the ramp slope B/T, and the signal runtime is proportional to twice the distance to the object. However, due to the run length difference Δ, the object distances for two adjacent antenna elements 10 differ from one another by 2Δ, so that the associated intermediate frequency signals also have a corresponding frequency difference, as is shown in FIG. 3.

Figure 3:
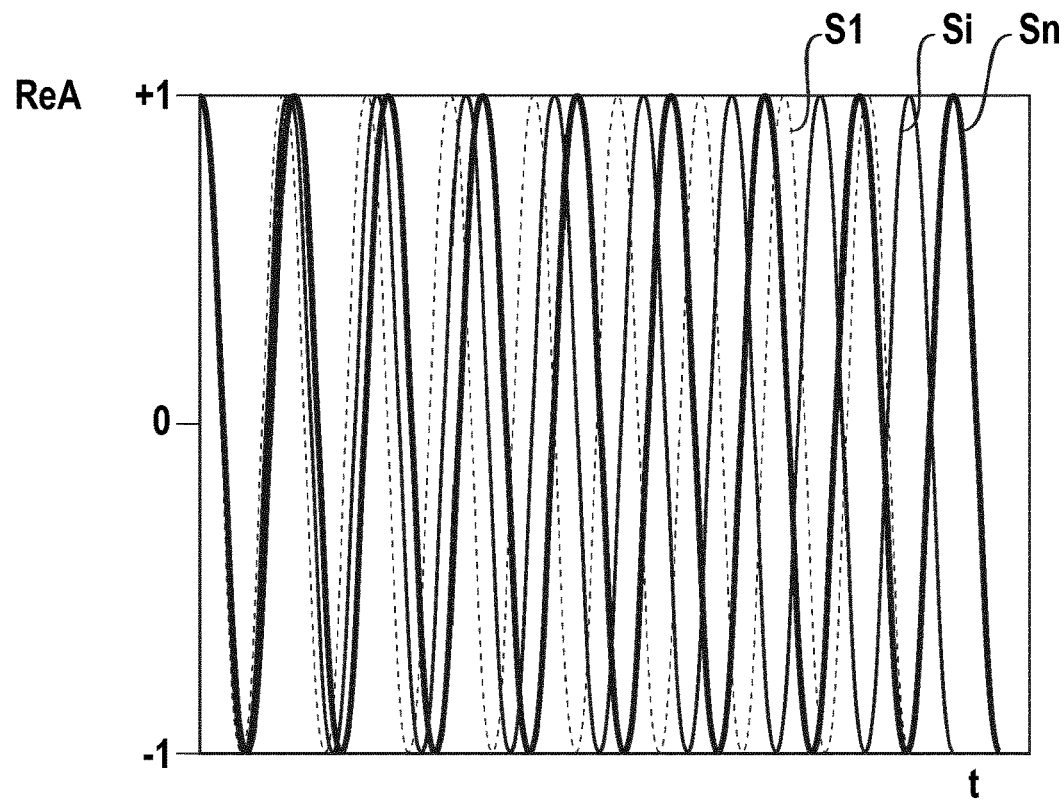
FIG. 3 shows examples of time signals received in different antenna elements of the radar signal according to FIG. 1.

FIG. 3 shows the time signals S1, Si, Sn as functions of time t. Here, on the vertical axis only the real part ReA of the (complex) amplitude A is indicated. It will be seen that the frequency of time signal S1 (for the antenna element that is furthest to the left in FIG. 1) is increased relative to the frequency of time signal Sn, due to the above-described run length difference. In window modules 22, this frequency offset is reversed, so that in the ideal case the corrected time signal Sn_c agrees with the corrected time signal S1_c and also with all other time signals Si_c. For this purpose, in each window module 22 the time signal is multiplied by a window function that is also a function of time:

$$Vi(t) = \exp(-j*2*\pi*(1/T)*(t-x)*b) \quad (1)$$

Here, $i = 1, \ldots n$ is a running index of the antenna element, j is the square root of $(-1)$, $\pi$ is the circle constant, T is the duration of the measurement period and is at the same time the ramp duration, b is a so-called bin offset, selected such that the run length difference for the preferred direction θ is compensated, and x is any value from the interval [0, T] that brings about a constant phase shift. $x = T/2$ has turned out to be advantageous.

The window function Vi(t) is a complex-valued function whose magnitude has the constant value 1 and whose phase is proportional to time t and to bin offset b. The expression "bin offset" results from the fact that the range of frequencies f on which the spectra F[Si_c] $(i=1, \ldots, n)$ is defined is subdivided into a plurality (for example 512) bins, each of which has a bin width $W = c/2B$, as is shown in FIG. 4.

Figure 4:
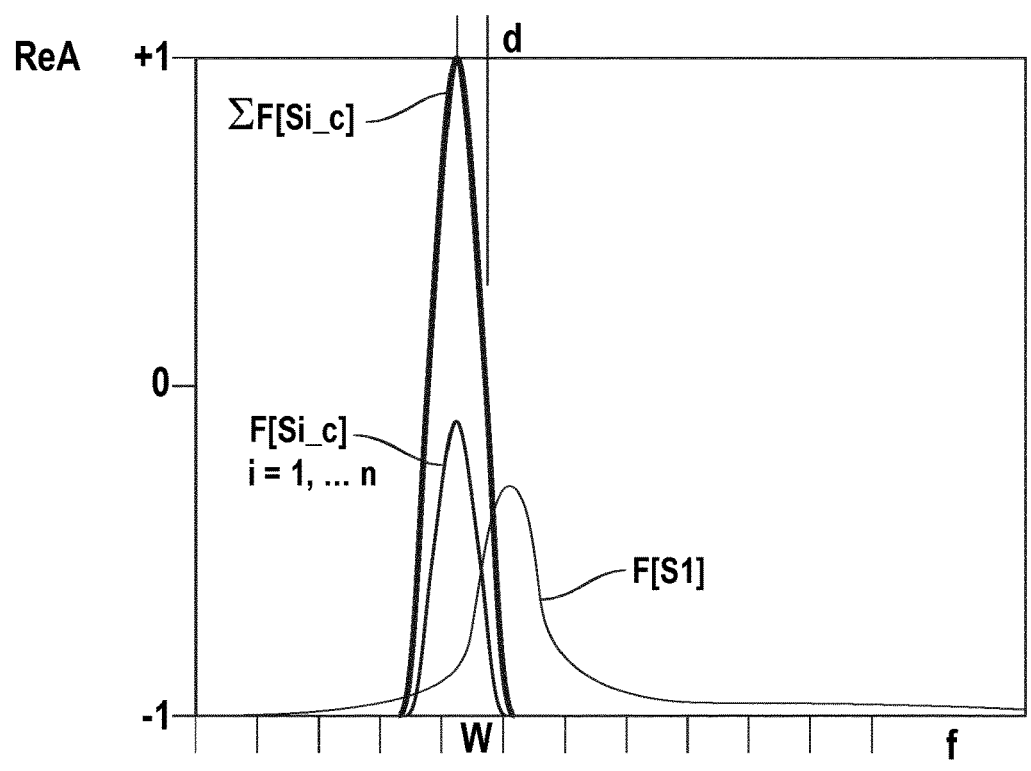
FIG. 4 shows spectra of the time signals according to FIG. 3.

It is to be noted that the bin width W has the dimension of a length, while on the horizontal axis in FIG. 4, frequency f is given as an independent variable. For the radar echo of an object having object distance D, the frequency f at which the peak originating from the object lies is however given by (in simplified fashion, neglecting the Doppler effect):

$$f = (B/T)*2D/c \quad (2)$$

Frequency f can thus be regarded as a measure for object distance D. The frequency bins shown in FIG. 4 are therefore equivalent to distance bins having bin width W.

Bin offset b is given by the ratio between the run length difference $(n-i)*\Delta$ between the ith and the nth antenna element and the bin width W, i.e.

$$b = (n-i)*\Delta/W = (n-i)*\Delta*2B/c \quad (3)$$

Under these conditions, the frequency offset between the peaks in the spectra F[Si] is equivalent to an apparent change in the object distance D that is equal to run length distance Δ. As a consequence, in the corrected spectra F[Si_c] the frequency offset is eliminated. In FIG. 4, all spectra F[Si_c] have the same shape, and therefore cannot be distinguished. For comparison, an uncorrected spectrum F[S1] is also shown that would be obtained through Fourier transformation of time signal S1, i.e. without windowing with window function V1. It will be seen that the corresponding peak in the spectrum is at a somewhat higher frequency than the peak in the spectra F[Si_c], agreeing with the frequency difference also seen in FIG. 3.

The coherent sum of the corrected spectra F[Si_c] yields the sum spectrum ΣF[Si_c]. This sum spectrum is distinguished by a high signal/noise ratio, and because the frequency offsets between the individual spectra are corrected, the increase of the frequency shift B does not result in a widening of the peak in the sum spectrum, but rather results in the desired increased distance resolution.

Figure 5:
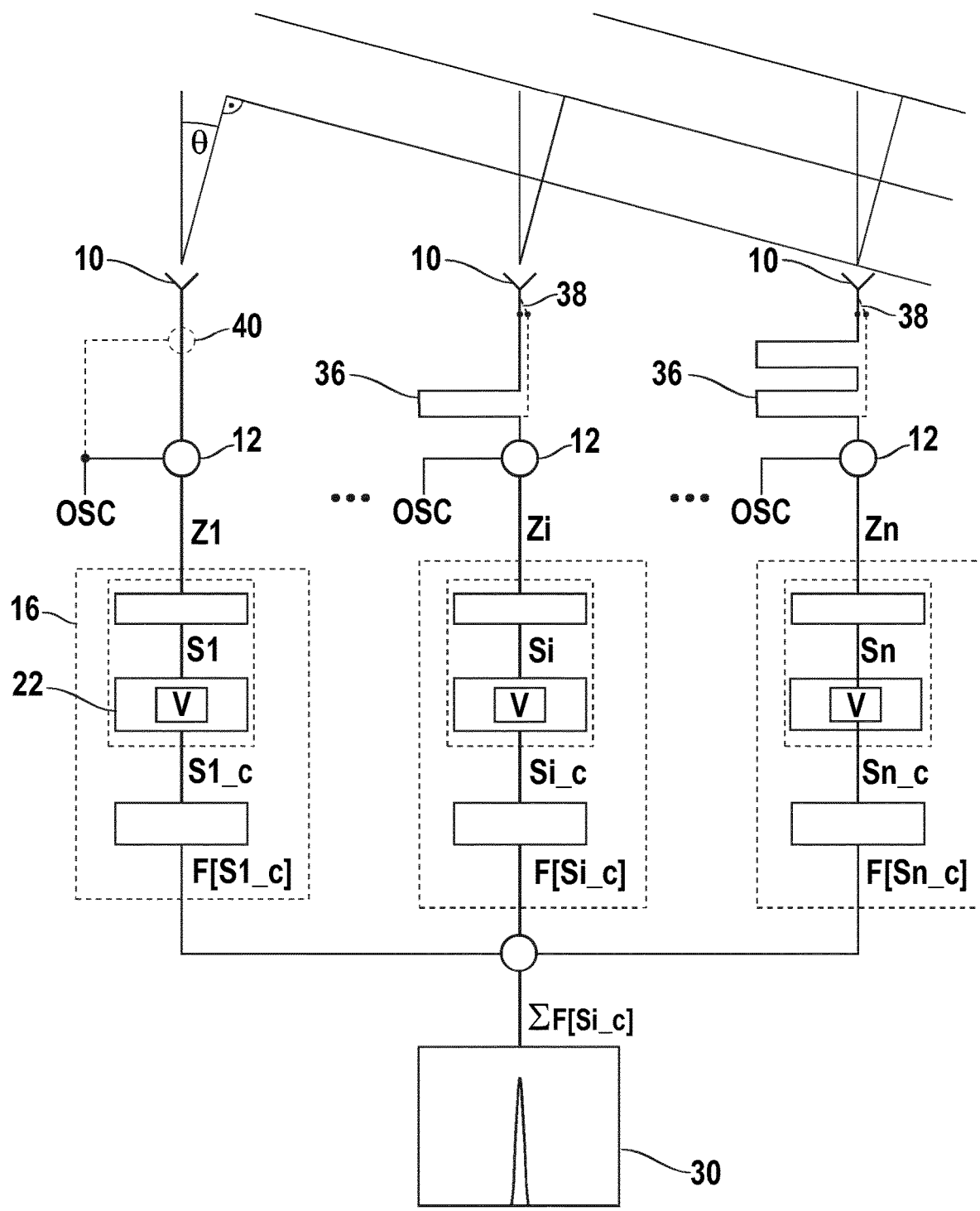
FIGS. 5 and 6 show block diagrams, analogous to FIG. 1, for different specific embodiments of the present invention.

FIG. 5 shows a modified exemplary embodiment in which the compensation of the run length differences is achieved through detour lines 36 that lengthen the signal path from antenna element 10 to mixer 12 to the extent to which the run length of the signal decreases. In this case as well, window modules 22 are indeed present in an evaluation device 16, but here the time signals are windowed only with real-valued window functions V that evaluate a suppression of side lobes. The complex-valued window functions Vi used in the first exemplary embodiment can also additionally contain a real-valued factor for the suppression of side lobes.

FIG. 5 shows only distance measuring device 30, but not the angular measuring device that is also present.

Because the detour lines 36 disturb the phase relationships between the signals on which the angular measurement is based, the signal paths can be changed over using switches 38. In an operating mode in which an angular measurement is to be carried out, the switches 38 take the position shown in dashed lines in FIG. 5, so that all signal paths have the same length. Only when a high-resolution distance measurement for signals from the preferred direction is to be carried out are the switches 38 switched over, thus activating detour lines 36.

According to the same principle, using switches for each antenna element it is also possible to switch over between a plurality of detour lines having different lengths, which define different preferred directions.

Figure 6:
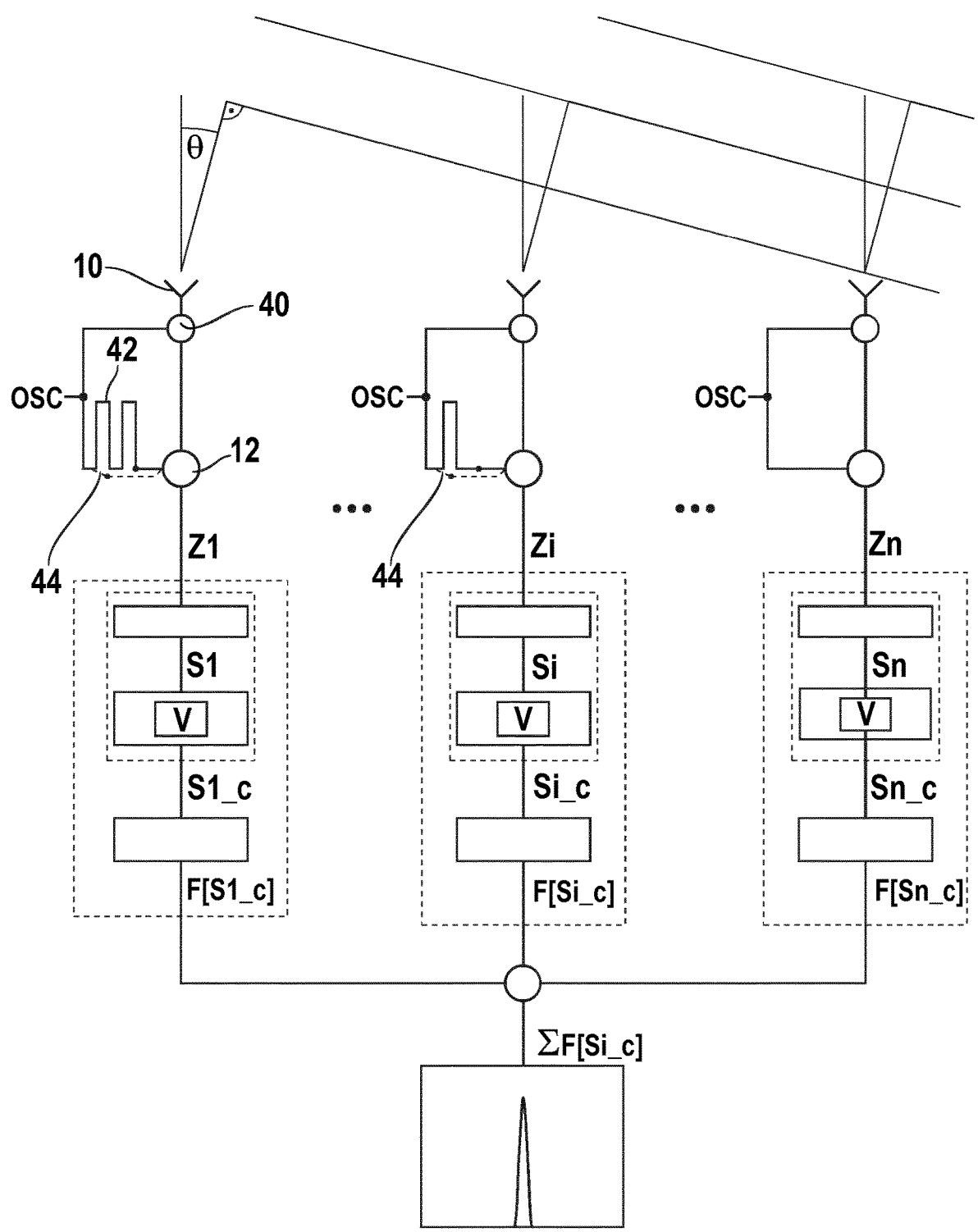

FIG. 6 shows an exemplary embodiment in which a monostatic antenna design is realized. Oscillator signal OSC is supplied to each of the antenna elements 10 via a circulator 40, so that each antenna element also operates as a transmit antenna. Detour lines 42 are provided in this case in the signal paths via which the oscillator signal OSC is supplied to mixer 12. As a result, the oscillator signal received by mixer 12 is delayed to the same degree by which the received signal that the mixer obtains via circulator 40 is delayed due to the run length difference. In this case as well, in this way the run length differences are compensated by different conductor lengths. In this case as well, detour lines 42 can be bridged using switches 44 in order to carry out angular measurements on the basis of unfalsified phase relationships.

Because in this exemplary embodiment the detour lines 42 are situated only in the conductor branch via which the oscillator signal is supplied to mixer 12, all antenna elements 10 receive phase-identical transmit signals, so that the main direction of radiation of the radar beams is the direction having azimuth angle zero. The same result would also be achieved with detour lines that are situated in the conductor path from circulator 40 to mixer 12. If, in contrast, the detour lines are situated in the conductor path via which the oscillator signal OSC is supplied to circulator 40, or in the conductor path between circulator 40 and antenna element 10, there then also result phase differences between the transmit signals, and correspondingly a beamforming would also result during the sending of the radar beam, and the main direction of radiation would be identical with the preferred direction at azimuth angle θ.

FIG. 5 illustrates, in dotted lines, a further exemplary embodiment in which a circulator 40 is allocated to only one of the antenna elements 10, namely the one situated furthest to the left, so that this antenna element also acts as transmit antenna, while all the other antenna elements only receive.

What is claimed is:

1. An FMCW radar sensor, comprising:
   a plurality of antenna elements situated at a distance from one another in a row, each of the antenna elements being assigned a respective mixer which produces an intermediate frequency signal by mixing a received signal with an oscillator signal, and a respective means for evaluating to record the intermediate frequency signal over a measurement period as a function of time, as a time signal, and to convert the time signal into a spectrum by Fourier transformation;
   a means for providing angular measuring in which the spectra obtained from the evaluation devices are evaluated in separate channels;
   a means for carrying out a beamforming for the received signal received from a specified preferred direction by compensating run length differences of the received signal to the antenna elements;
   a means for forming a sum spectrum through coherent addition of the spectra; and
   a means for determining distances of objects in the specified preferred direction based on the sum spectrum;
   wherein for the specified preferred direction, the run length differences are compensated so as to optimize the beamforming for the specified preferred direction, and wherein the coherent addition results in greater location sensitivity and improved distance resolution for objects situated in the specified preferred direction, and wherein the compensation of the run length differences provides that the increase of the frequency shift does not result in a widening of the peaks, but results in an improvement of the distance resolution, and
   wherein compensation of the run length differences is possible only for a particular azimuth angle that indicates a particular direction of incidence of radar radiation, and wherein the direction of incidence is the preferred direction and is indicated by the azimuth angle.

2. The radar sensor as recited in claim 1, wherein each of the means for evaluating is configured to compensate the runtime differences by windowing the time signals with complex-valued window functions before the Fourier transformation.

3. The radar sensor as recited in claim 1, wherein to compensate the runtime differences, detour lines are provided in signal paths for the received signal and/or the oscillator signal.

4. The radar sensor as recited in claim 3, further comprising:
   switches configured to switch over between detour lines having length differences that are different from antenna element to antenna element, and thus between different preferred directions.

5. The radar sensor as recited in claim 1, wherein the antenna elements are operable as transmit antennas for transmitting a transmit signal that is synchronous with the oscillator signal.

6. The radar sensor as recited in claim 1, wherein at least one of the antenna elements is also operable as a transmit antenna, and a plurality of others of the antenna elements are operable only as receive antennas.

7. The radar sensor as recited in claim 1, wherein the compensation of the run length differences is achieved through detour lines that lengthen the signal path from each of the antenna elements to the respective mixer to the extent to which the run length of the signal decreases, and wherein switches are used for each of the antenna elements to switch over between a plurality of detour lines having different lengths, which define different preferred directions.

* * * * *